United States Patent [19]
Paolini et al.

[11] 3,787,091
[45] Jan. 22, 1974

[54] CUTTING CHAIN

[75] Inventors: Alfred P. Paolini; Warren E. Fife, both of Columbus, Ohio

[73] Assignee: Jeffrey Galion Inc., Columbus, Ohio

[22] Filed: May 26, 1972

[21] Appl. No.: 257,301

[52] U.S. Cl. .................................... 299/84, 299/86
[51] Int. Cl. ............................................ E21c 25/34
[58] Field of Search .................... 299/82–84, 91–93

[56] References Cited
UNITED STATES PATENTS
2,155,526  4/1939  Bowman .............................. 299/91
894,184  7/1908  Buel .................................... 299/84

*Primary Examiner*—Ernest R. Purser
*Attorney, Agent, or Firm*—David Young

[57] ABSTRACT

A chain link for a cutting chain with a boss for supporting a cutter bit. The boss extends laterally beyond the link body and overlies an adjacent chain link in an adjacent row of the chain. The boss is relieved to mate with the adjacent link and to permit articulation of the links relatively to each other. The chain link body and the boss are symmetrical, so that the chain link may be turned for either end of the chain link to be leading in the direction of advance of the chain.

4 Claims, 8 Drawing Figures

3,787,091

CUTTING CHAIN

BACKGROUND OF THE INVENTION

1. Field of the Invention

The instant invention relates to cutting chains with chain links having bosses which support cutter bits in position to cut and break material as the cutting chain and the chain links with the cutter bits are advanced in and through the material. The boss projects laterally beyond the link body such that it overlies an adjacent link in the chain. The boss is relieved to mate with the adjacent link and to permit articulation of the links relatively to each other.

2. Description of the Prior Art

Cutting chains having chain links with bosses which support cutter bits are comprised of outside rows and center rows of chain links connected by lateral chain pins. The chain may have any number of rows or lines of links, depending upon the width of the link and the desired chain width.

A chain link having a boss centered on a link body for supporting a cutter bit laterally centered on the link body can be used in the aforementioned cutting chains. The chain link having a laterally centered boss can be utilized in any row of a cutting chain.

The lateral distance between cutter bits in the outer rows of the cutting chain determines the width of the cut made by the cutting chain. The lateral width of cut has been increased by placing chain links with laterally projecting bosses in the outside rows of the cutting chain to support a cutter bit in a position that is laterally spaced from the center of the link. Heretofore, such a link could only be used in the outside rows of the cutting chain, since there would be interference with an adjacent link if the link were positioned such that the laterally projecting boss extended inwardly toward an adjacent row of chain links.

It is sometimes necessary to have a closer lateral spacing between cutter bits in adjacent rows of the cutting chain than is available when only chain links with laterally centered bosses are used. As an example, closer lateral spacing of the cutter bits is necessary when a cutting chain is cutting a hard material such as iron ore, rather than a relatively soft material such as coal, which also is friable. Thus, it is desirable to be able to use a chain link with a laterally projecting bit receiving boss in a center row or in an outside row with the lateral boss extension projecting toward the center row of the cutting chain.

The instant invention provides a cutting chain link having a laterally projecting boss which carries a cutter bit that is laterally spaced from the center of the link body, and can be used in any row of the cutting chain.

SUMMARY

The instant invention provides a cutting chain link, adapted to be used in a row of a cutting chain having a laterally extending boss which projects upwardly from the link body, and projects laterally beyond the link body. The boss has opposite faces obliquely disposed thereon. The boss supports a cutter bit laterally spaced from the center of the link body. Either of the oblique faces may be machined to receive a cutter bit according to the direction of advance of the link body. The part of the boss that projects beyond the link body is relieved to overlap chain links in an adjacent row of the cutting chain and to permit articulation of the chain links relatively to each other.

The chain link of the instant invention can be positioned in a center row or in either outside row of a cutting chain, with the laterally projecting boss on either side of the chain link.

It is an object of the instant invention to provide an improved cutting chain link to be used in a cutting chain having a cutter bit receiving boss that projects laterally from the link body and overlies an adjacent chain link, and permits articulation of the chain links relatively to each other.

It is another object of the invention to provide a cutting chain link in which the laterally projecting bit receiving boss is relieved to overlie an adjacent link and permit relative articulation of the links.

It is a further object of the invention to provide a cutting chain link with a laterally projecting boss having opposite oblique faces, either of which may be adapted to receive a cutter bit, and the boss is relieved to fit with adjacent chain links and to permit relative articulation of the chain links.

Other objects of the invention will appear hereinafter, the novel features and combinations being set forth in the appended claims.

DESCRIPTION OF THE PREFERRED EMBODIMENT

Figure 1:
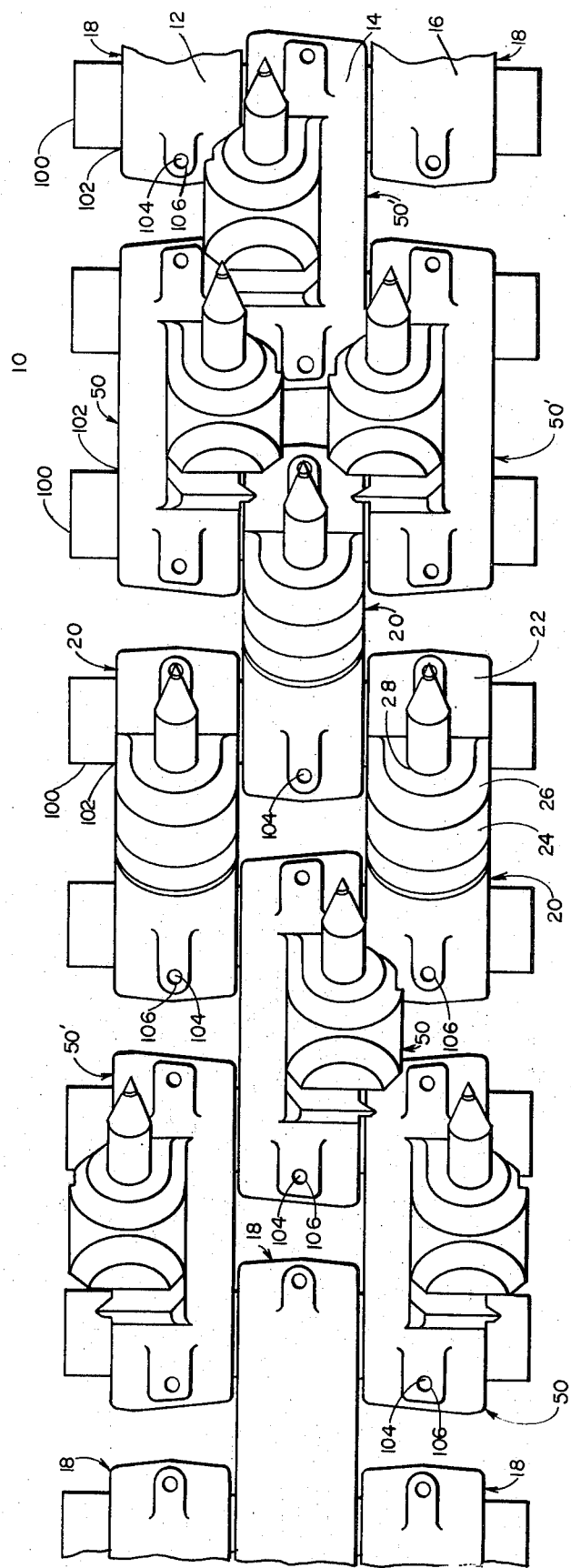
FIG. 1 is a plan view of a cutting chain having a center and two outside rows of cutting chain links.
Figure 2:
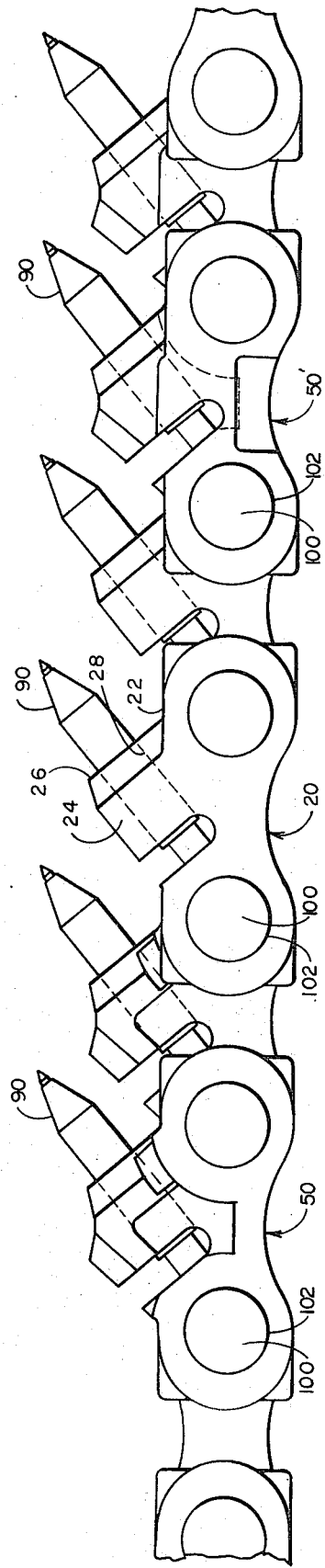
FIG. 2 is an elevational view of the cutting chain of FIG. 1.
Figure 8:
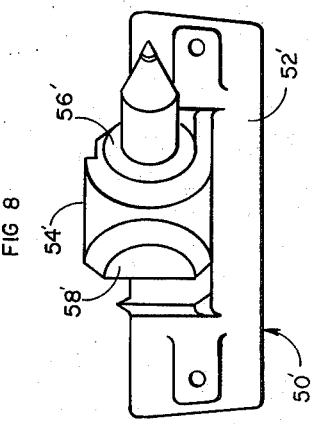
FIG. 8 is a plan view of the cutting chain link of FIG. 7.

A cutting chain 10 for mining material, for example, coal, is shown in FIGS. 1 and 2. The cutting chain 10 can also be used for mining other materials, such as trona and iron ore. In the form shown, the cutting chain 10 is intended to be used on a mining machine of the type disclosed in U.S. Pat. No. 3,305,273 in which it functions as a clearance cutting chain, but it can also be adapted for use with other mining apparatus.

The cutting chain 10 has three parallel rows 12, 14, 16 of chain links 18, 20, 50 and 50′, of which two are outside rows 12 and 16, and one is a center row 14.

There are three types of chain links used in the three rows 12, 14 and 16 of the cutting chain 10. The differences between the three types of links is whether they support a cutter bit, and is so, in what manner.

The simplest type of chain link 18 used in the cutting chain 10 does not support a cutter bit. The chain link 18 has a generally elongated symmetrical body. The front and rear ends of the link 18 adjacent the corners are rounded, and it is used to connect and space chain links 20, 50 and 50' which do support cutter bits. The chain link 18 can be used in any of the rows 12, 14 and 16 of the cutting chain 10.

A second type of chain link 20 used in the cutting chain 10 supports a cutter bit centered laterally on a chain link body 22. A boss 24 projects upwardly from the link body 22, and terminates in a face 26 that is obliquely disposed with respect to the direction of advance of the cutting chain 10. The front and rear ends of the link body 22 adjacent the corners are rounded. The boss 24 is laterally centered on the link body 22, and does not extend beyond the lateral dimensions thereof. A cutter bit receiving bore 28 extends downwardly from the oblique face 26 through the boss 24 and into the link body 22. The bore 28 supports a cutter bit laterally centered on the link body 22.

A centered boss chain link 20 can be utilized in each of the three rows 12, 14 and 16 of the cutting chain 10 to support a cutter bit in one lateral position.

The positioning of the different types of chain links 20, 50 and 50' which support cutter bits in the rows 12, 14 and 16 of the cutting chain 10 is called the lacing pattern of the chain. A different lacing pattern is necessary for cutting different materials. As an example, closer lateral spacing of the cutter bits is necessary when the cutting chain 10 is cutting a hard material such as iron ore, rather than a relatively soft material such as coal, which is also friable.

In order to have cutter bits closer to each other in the transverse direction than is provided by cutter bits supported in bosses 24 that are laterally centered on chain links 20, the instant cutting chain 10 is provided with a third type of chain link, which supports a cutter bit laterally spaced from the center of the link body.

The third type of chain link can be made to support a cutter bit laterally spaced to either side of the link body center, as hereinafter described. A chain link 50 supporting a cutter bit offset to one side of the link body center can be used in the rows 12, 14 and 16 of the cutting chain 10, and a chain link 50' suppoting a cutter bit offset to the other side of the link body center can also be used in the rows 12, 14 and 16 as seen in FIG. 1.

The chain links 50 and 50' provide second and third positions for supporting a cutter bit in each of the rows 12, 14 and 16 of the cutting chain 10.

Figure 4:
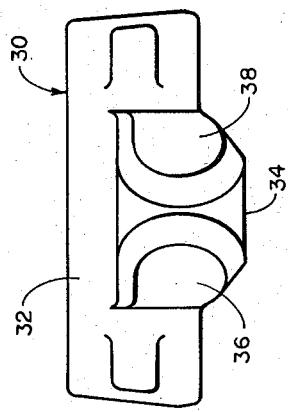
FIG. 4 is a plan view of the chain link blank of FIG. 3.
Figure 3:
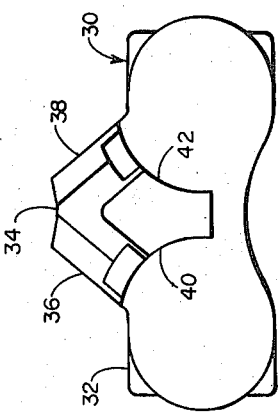
FIG. 3 is an elevational view of a cutting chain link blank having a boss that projects to one side of the link body.

FIGS. 3 and 4 illustrate a forged chain link blank 30 prior to being machined for the reception of a cutter bit laterally spaced from the link body center. The blank 30 could also be formed by casting or by other methods. The chain link blank 30 comprises a link body 32 and an upwardly projecting boss 34 which terminates in a pair of opposite oblique faces 36 and 38. Each of the oblique faces 36 and 38 intersects with the link body 32. The boss 34 extends beyond the lateral dimension of the link body 32, and is laterally offset to one side of the center of the link body 32. The bottom of the boss extension is relieved to form a pair of curved surfaces 40 and 42.

The boss extension projects beyond the link body 32 a distance les than half the width of the link body 32. The front and rear ends of the link body 32 adjacent the corners are rounded to fit under and mate with other link bodies 50 and 50' having a relieved boss extension.

Figure 7:
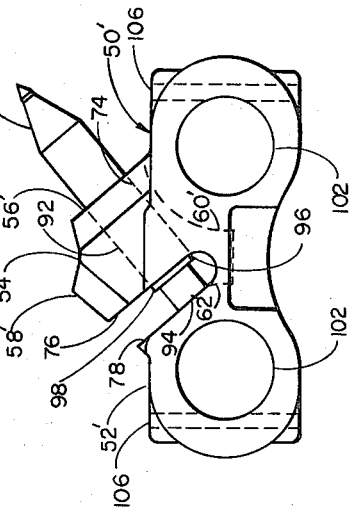
FIG. 7 is an elevational view of a cutting chain link machined from a blank shown in FIG. 3 that has been rotated 180° with a cutter bit receiving bore in one oblique face and a cutter bit positioned within the bore.
Figure 5:
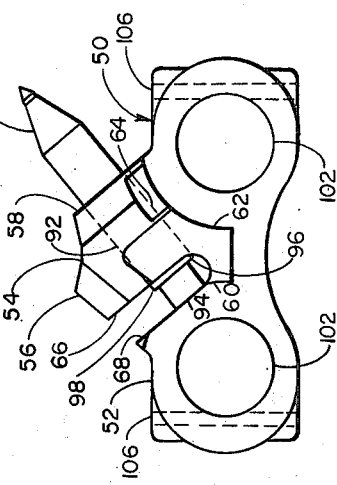
FIG. 5 is an elevational view of a cutting chain link machined from a blank shown in FIG. 3 with a cutter bit receiving bore in one oblique face, and a cutter bit positioned within the bore.

FIGS. 5 and 7 illustrate chain links 50 and 50' which support cutter bits laterally spaced from the center of the link bodies. Chain links 50 and 50' are machined from identical chain link blanks 30. FIG. 5 illustrates a chain link where one oblique face 38 of a chain link blank 30 is machined to receive a cutter bit, whereas FIG. 7 illustrates a chain link where a chain link blank 30 has been rotated 180° and the other oblique face 36 is machined to receive a cutter bit.

The elements of the chain link 50 are the same as the elements of the chain link blank 30, and are given the same name.

Figure 6:
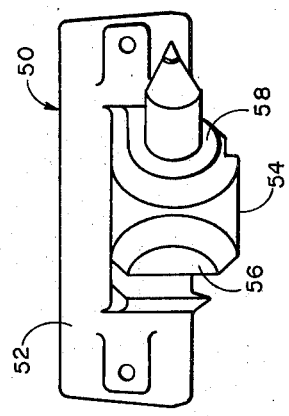
FIG. 6 is a plan view of the cutting chain link of FIG. 5.

The chain link 50 shown in FIGS. 5 and 6 has a boss 54 projecting upwardly from a link body 52 and terminating in a pair of opposite oblique faces 56 and 58. The boss 54 extends beyond the lateral dimension of the link body 52, and is laterally offset to one side of the center of the link body 52. The bottom of the boss extension is relieved to form a pair of curved surfaces 60 and 62. The front and rear ends of the link body 52 adjacent the corners are rounded to fit under and mate with chain links having relieved bosses 50 and 50' in an adjacent row of the cutting chain 10 as shown in FIGS. 1 and 2.

The chain link 50 shown in FIG. 5 has an oblique face 58 made flat by a milling operation. A cutter bit receiving bore 64 is drilled inwardly from the oblique face 58 through the boss 54 into the link body 52. A slot 66, formed by a milling operation, extends inwardly from the oblique face 56 normal to the axis of the bore 64, and intersects the end of the bore 64 in the link body 52. The rear face of the slot 66 is hardened to provide a seat 68 for a cutter bit 90. The cutter bit shank 92 extends through the bore 64, and the end 94 of the shank 92 rests against the seat 68. A groove 96 is formed in the shank 92 to receive a ring 98 which prevents longitudinal movement of the cutter bit 90 to retain the bit 90 in the bore 64. The ring 98 and groove 96 are within the slot 66, and are easily accessible for changing the cutter bit 90.

Since the only difference between chain link 50' illustrated in FIG. 7 and the chain link 50 illustrated in FIG. 5 is that a chain link blank 30 is rotated 180° prior to being machined to form the chain links 50 and 50', the elements of link 50' that are the same as the elements of link 50 are denoted by a prime symbol ('), and are not described again.

The chain link 50' shown in FIG. 7 has an oblique face 56' made flat by a milling operation. A cutter bit receiving bore 74 is drilled inwardly from the oblique face 56' through the boss 54' into the link body 52'. A slot 76, formed by a milling operation, extends inwardly from the oblique face 58' normal to the axis of the bore 74, and intersects the end of the bore 74 in the link body 52'. The rear face of the slot 76 is hardened to provide a seat 78 for a cutter bit 90. The cutter bit shank 92 extends through the bore 74, and the end 94 of the shank 92 rests against the seat 78. The ring 98 and groove 96 which retain the cutter bit 90 in the bore 74 have been previously described with respect to the chain link 50 and function the same way in the chain link 50'.

Chain links 20, 50 and 50' supporting cutter bits in three different lateral positions in each row 12, 14 and 16 of the cutting chain 10 are illustrated in FIG. 1. The curved surfaces 60, 62, 60' and 62' of the chain links 50 and 50' overlap the rounded ends adjacent the corners of the chain links 18, 20, 50 and 50' in adjacent rows of the cutting chain, and permit relative articulation between the chain links.

When the chain links 50 and 50', which support cutter bits spaced from the center of the link body, are positioned in the center row of the cutting chain, the boss extension of the chain links 50 and 50' overlap adjacent link bodies in the outside rows 16 and 12, respectively, of the cutting chain 10.

Likewise, when the chain link 50 is positioned in one outside row 12, and the chain link 50' is positioned in the other outside row 16, the boss extensions of the chain links 50 and 50' overlap adjacent link bodies in the center row 14 of the cutting chain 10.

As can be seen in FIGS. 1 and 2, the boss extensions of the chain links 50 and 50' overlap the rounded front end of an adjacent link body, and the rounded rear end of another adjacent link body.

The chain links 18, 20, 50 and 50' have a bore 102 at each end for receiving a pin 100 that connects the chain links for relative articulation. The diameter of the bore 102 is slightly greater than the diameter of the chain pin 100, so that the pin 100 can easily be inserted into the bore 102.

As shown in FIG. 1, three laterally spaced rows 12, 14 and 16 of the cutting chain 10 are linked together by passing a chain pin 100 through the bores 102, so as to connect the front end of the center row 14 links with the rear end of the links in the outer rows 12 and 16, and the rear of the center row 14 links with the front of the links in the outer rows 12 and 16.

Pins 104 are used to secure the chain links 18, 20, 50 and 50' to the chain pins 100, and to maintain the links in spaced relationship. Other means may be used to secure the pins. Each link is provided with one or more circular lock pin holes 106 that extend downwardly from the top of the chain link bodies 18, 20, 50 and 50' into the chain pin bores 102. The lock pin holes have a diameter slightly less than that of the cylindrical lock pins 104. The lock pins 104 may be fluted for forced insertion into the lock pin holes 106. When so inserted, and when the cutting chain links 18, 20, 50 and 50' are properly positioned, the lock pin 104 rests in an annular groove, not shown, in the chain pin 100. The fit between the lock pin and the groove permits the chain pin 100 to rotate.

The improved cutting chain link for a cutting chain provides a link body having a boss which supports a cutter bit that is laterally spaced from the center of the link body. The boss extends beyond the lateral dimension of the link body. The instant chain link boss is relieved to overlap adjacent chain links in adjacent rows of the cutting chain, and to permit articulation of the adjacent links relatively to each other.

Obviously, those skilled in the art may make various changes in the details and arrangement of parts without departing from the spirit and scope of the invention as defined by the claims hereto appended, and applicants, therefore, wish not to be restricted to the precise construction herein disclosed.

Having thus described and shown an embodiment of the invention, what is desired to secure by Letters Patent of the United States is:

1. An integral cutting chain link formed as a unitary element for a cutting chain having adjacent rows of links, said link being adapted to support a cutter bit in position to cut and break material as the cutting chain and the chain links thereof are advanced in the material comprising: a chain link body with lateral bores that are substantially spaced from each other in the longitudinal direction of the chain link to receive pins for connecting the chain link to other chain links in an articulated assembly of the cutting chain, a substantial portion of said chain link body being disposed between said lateral bores, a boss integral with the link body and projecting upwardly from said link body between said lateral bores; a portion of said boss projecting laterally beyond said link body; a face on said boss obliquely disposed with respect to the direction of advance of said link body; a cutter bit receiving bore extending rearwardly from said oblique face through said boss and into said link body between said lateral bores to receive a cutting bit that has a cylindrical shank with the cutting bit shank being supported at least in part in said bore in the chain link body said portion of the boss that projects beyond the lateral dimension of said link body being relieved adjacent the link body to overlap a chain link body in an adjacent row of chain links and to permit articulation of said chain links relative to each other.

2. A cutting chain link as recited in claim 1, wherein said relieved projection has a curved surface in the bottom of said boss projection beneath said oblique face adapted to overlap said adjacent rows of links.

3. A cutting chain link as recited in claim 2, including a second oblique face on said boss oppositely disposed with respect to the first said oblique face on said boss.

4. A cutting chain link as recited in claim 3 wherein said relieved projection has a second curved surface in the bottom of said boss projection beneath said second oblique face adapted to overlap said adjacent rows of links.

* * * * *